United States Patent
Yasuda et al.

(10) Patent No.: US 10,310,143 B2
(45) Date of Patent: Jun. 4, 2019

(54) ANTI-REFLECTION OPTICAL MEMBER

(71) Applicant: FUJIFILM Corporation, Tokyo (JP)

(72) Inventors: Hideki Yasuda, Ashigarakami-gun (JP); Ryou Matsuno, Ashigarakami-gun (JP); Takeharu Tani, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 326 days.

(21) Appl. No.: 15/168,532

(22) Filed: May 31, 2016

(65) Prior Publication Data

US 2016/0291207 A1 Oct. 6, 2016

Related U.S. Application Data

(63) Continuation of application No. PCT/JP2014/005987, filed on Dec. 1, 2014.

(30) Foreign Application Priority Data

Dec. 3, 2013 (JP) .................... 2013-250138
Aug. 15, 2014 (JP) .................... 2014-165347

(51) Int. Cl.
*G02B 1/10* (2015.01)
*G02B 1/111* (2015.01)
(Continued)

(52) U.S. Cl.
CPC .............. *G02B 1/111* (2013.01); *C03C 17/34* (2013.01); *G02B 1/113* (2013.01); *G02B 1/16* (2015.01);
(Continued)

(58) Field of Classification Search
CPC ........... G02B 1/16; G02B 1/111; G02B 1/113; G02B 1/118; G02B 5/02; G02B 5/008;
(Continued)

(56) References Cited

U.S. PATENT DOCUMENTS

2005/0233131 A1 10/2005 Nishida et al.
2009/0067053 A1 3/2009 Momoki et al.
(Continued)

FOREIGN PATENT DOCUMENTS

CN 101441282 A 5/2009
EP 1 548 469 A1 6/2005
(Continued)

OTHER PUBLICATIONS

Japanese Office Action dated Feb. 28, 2017 in Japanese Patent Application No. 2014-165347, with English language translation.
(Continued)

*Primary Examiner* — Mustak Choudhury
(74) *Attorney, Agent, or Firm* — Birch, Stewart, Kolasch & Birch, LLP

(57) ABSTRACT

An anti-reflection optical member has a laminated structure including: a transparent substrate having a first refractive index greater than that of a predetermined medium; a metal-microparticle-containing layer containing metal microparticles; and a dielectric layer having a second refractive index greater than that of the predetermined medium, in this order. At least 60% of the metal microparticles are flat particles with a diameter-to-thickness ratio of 3 or more. Principal planes of the flat metal particles are surface-oriented in the range from 0° to 30° relative to the surface of the metal-microparticle-containing layer. In the metal-microparticle-containing layer, the metal microparticles are disposed without forming a conductive path. The dielectric layer has such a thickness that light reflected at the surface of the dielectric layer of incident light entering the laminated structure from the surface is interfered and canceled by light reflected at the interface between the dielectric layer and the metal-microparticle-containing layer.

15 Claims, 5 Drawing Sheets

(51) Int. Cl.
*G02B 1/113* (2015.01)
*G02B 1/16* (2015.01)
*G02B 5/00* (2006.01)
*G02B 5/28* (2006.01)
*C03C 17/34* (2006.01)

(52) U.S. Cl.
CPC ............ *G02B 5/008* (2013.01); *G02B 5/282* (2013.01); *B32B 2264/105* (2013.01); *B32B 2307/204* (2013.01); *B32B 2307/412* (2013.01); *B32B 2307/418* (2013.01); *B32B 2551/00* (2013.01); *C03C 2217/445* (2013.01); *C03C 2217/479* (2013.01)

(58) Field of Classification Search
CPC .......... G02B 5/26; G02B 5/201; G02B 5/204; G02B 5/206; G02B 5/223; G02B 5/282; G02B 27/0018; C03C 17/007; C03C 17/34; C03C 17/366; C03C 2217/73; B32B 2264/105; B32B 17/1044; B32B 17/10788; B32B 2370/204; B32B 2370/412; B32B 2370/418; B32B 17/10036; B32B 17/10706; B32B 17/10853
USPC .................. 359/241, 350, 485.02, 585, 599; 428/323, 333, 411.1
See application file for complete search history.

(56) References Cited

U.S. PATENT DOCUMENTS

| | | | |
|---|---|---|---|
| 2009/0201583 A1 | 8/2009 | Kamada et al. | |
| 2011/0111210 A1* | 5/2011 | Matsunami et al. | ............ C03C 17/007 428/328 |
| 2012/0075688 A1* | 3/2012 | Yamada | ............ G02B 5/008 359/241 |
| 2013/0071651 A1 | 3/2013 | Hakuta et al. | |
| 2014/0212655 A1 | 7/2014 | Matsuno et al. | |

FOREIGN PATENT DOCUMENTS

| | | |
|---|---|---|
| JP | 2001-281401 A | 10/2001 |
| JP | 2005-218889 A | 8/2005 |
| JP | 2007-334150 A | 12/2007 |
| JP | 2009-69358 A | 4/2009 |
| JP | 4400458 B2 | 1/2010 |
| JP | 2010-256751 A | 11/2010 |
| JP | 2012-108207 A | 6/2012 |
| WO | WO 2004/031813 A1 | 4/2004 |
| WO | 2013/047771 A1 | 4/2013 |

OTHER PUBLICATIONS

International Search Report for PCT/JP2014/005987 dated Mar. 31, 2015.
Written Opinion of the International Searching Authority for PCT/JP2014/005987 dated Mar. 31, 2015.
Chinese Office Action dated Apr. 27, 2017, issued in Chinese Patent Application No. 201480065363.1 with English machine translation.
Chinese Office Action and Search Report, dated Oct. 28, 2016, for Chinese Application No. 201480065363.1, and an English translation of the Office Action only.
Extended European Search Report, dated Nov. 18, 2016, for European Application No. 14867734.7.
European Office Action dated May 23, 2018, issued in European Patent Application No. 14 867 734.7.

* cited by examiner

ANTI-REFLECTION OPTICAL MEMBER

CROSS-REFERENCE TO RELATED APPLICATIONS

This application is a Continuation of PCT International Application No. PCT/JP2014/005987 filed on Dec. 1, 2014, which claims priority under 35 U.S.C. § 119(a) to Japanese Patent Application No. 2013-250138 filed on Dec. 3, 2013 and Japanese Patent Application No. 2014-165347 filed on Aug. 15, 2014. Each of the above applications is hereby expressly incorporated by reference, in its entirety, into the present application.

BACKGROUND OF THE INVENTION

1. Field of the Invention

The present invention relates to an anti-reflection optical member that has a function of anti-reflectivity with respect to incident light.

2. Description of the Related Art

In the related art, a display section of a display has been provided with an anti-reflection structure (anti-reflection film) on a translucent member in order to prevent visibility from being lowered due to reflection of an external light source or a landscape.

For example, known examples of an anti-reflection optical member having anti-reflectivity with respect to visible light include a dielectric multilayer, an anti-reflection film that comprises a visible-light-wavelength absorption layer formed of a metal microparticle layer in a multilayer film (WO2004/031813A (JP4400458B), JP2001-281401A, and the like).

WO2004/031813A (JP4400458B) discloses the following configuration. In an anti-reflection film which is formed by applying a plurality of thin films onto a substrate film, an attenuation coefficient at a wavelength of 550 nm is set to 0.1 to 5. For example, the anti-reflection film may comprise a layer that contains metal microparticles.

JP2001-281401A discloses a low-reflectivity transparent conductive laminated film using a chain-like metal colloid. In a description thereof, there is provided a transparent conductive layer including the chain-like metal colloid, whereby it is possible to obtain a film having an antistatic property, an electromagnetic-wave-shielding property, anti-reflectivity, a mechanical property, and an antifouling property.

SUMMARY OF THE INVENTION

In WO2004/031813A (JP4400458B), the layer of which the attenuation coefficient at the wavelength of 550 nm is set to 0.1 to 5 is a layer that absorbs incident light with the wavelength of 550 nm, and has a configuration in which an anti-reflection effect is increased by absorbing the incident light. However, in the configuration described in WO2004/031813A (JP4400458B), there is a problem in that the transmittance of the incident light is lowered due to absorption. Further, although it is possible to obtain a large anti-reflection effect with respect to a wavelength of 550 nm, there is a problem in that a bandwidth in which a large anti-reflection effect can be obtained is very narrow.

In JP2001-281401A, in a case where a metal colloid has a chain shape so as to have an antistatic function, as in WO2004/031813A (JP4400458B), there is concern regarding the same problem of a layer including a chain-like metal colloid absorbing incident light.

The present invention has been made in consideration of the above-mentioned situation. An object thereof is to provide an anti-reflection optical member capable of providing a large anti-reflection effect at a wider bandwidth without causing deterioration in transmittance.

According to the present invention, there is provided an anti-reflection optical member that prevents incident light with a predetermined wavelength from being reflected and that is used in a predetermined medium, the anti-reflection optical member having a laminated structure in which the following are laminated in this order: a transparent substrate that has a first refractive index greater than that of the predetermined medium; a metal-microparticle-containing layer that contains a plurality of metal microparticles; and a dielectric layer that has a second refractive index greater than that of the predetermined medium, in which at least 60% of all the plurality of metal microparticles are flat metal particles each of which has a ratio of diameter to thickness of equal to or greater than 3, in which main flat surfaces of the flat metal particles are oriented in a plane at in a range of 0° to 30° to a surface of the metal-microparticle-containing layer, in which in the metal-microparticle-containing layer, the plurality of metal microparticles is disposed without forming a conductive path, and in which a thickness of the dielectric layer is a thickness at which light reflected on a surface of the dielectric layer in a case where the incident light enters the laminated structure from the surface of the dielectric layer interferes with and is canceled out by light reflected on an interface between the dielectric layer and the metal-microparticle-containing layer.

The incident light with the predetermined wavelength is light to which anti-reflection applies in the anti-reflection optical member of the present invention. Although depending on the application, it is preferable that the predetermined wavelength is a wavelength shorter than a plasmon resonance wavelength of the flat metal particles.

The predetermined medium is a medium through which incident light is propagated, and is a medium such as the atmosphere (air) or water to which at least the surface of the anti-reflection optical member of the present invention is exposed.

It is preferable that a thickness of the dielectric layer is equal to or less than 400 nm.

Further, it is preferable that the thickness of the dielectric layer is a thickness which is equal to or less than an optical path length of $\lambda/4$ when the predetermined wavelength is set as $\lambda$. Here, the optical path length of the dielectric layer indicates a value obtained through multiplication of a physical thickness of the dielectric layer by a refractive index of the dielectric layer.

Theoretically, an optimal thickness of the dielectric layer is an optical path length of $\lambda/8$, but an optimal value thereof varies in a range of $\lambda/16$ to $\lambda/4$, depending on conditions of the metal-microparticle-containing layer. Thus, it is preferable that the optimal value is appropriately set in accordance with a layer configuration.

The determination as to whether or not the plurality of metal microparticles is disposed without forming a conductive path is performed on the basis of an image obtained by a scanning electron microscope (SEM). Specifically, a region of 2.5 µm×2.5 µm on the metal-microparticle-containing layer of the optical member is observed through the scanning electron microscope (SEM). Then, in a case where microparticles are continuously connected in a range from the left end to the right end of the obtained image, a conductive path is considered to be formed. In a case where microparticles are disconnected in mid-course, a conductive path is considered to be not formed.

In the present invention, it is preferable that the incident light with the predetermined wavelength is visible light (380 nm to 780 nm). That is, it is preferable that the anti-reflection optical member of the present invention has a function of anti-reflectivity with respect to visible light.

It is preferable that the diameter of the flat metal particle is equal to or less than 300 nm.

Examples of the metal of the metal microparticles include silver, gold, aluminum, copper, rhodium, nickel, platinum, titanium, and the like. However, it is most preferable that the metal is silver.

It is preferable that the first refractive index of the transparent substrate is less than 1.8.

In the metal-microparticle-containing layer, it is preferable that the plurality of metal microparticles is disposed without forming a conductive path. However, it is more preferable that at least 10% of the plurality of metal microparticles are disposed to be isolated from each other, and it is yet more preferable that at least 50% of the plurality of metal microparticles are disposed to be isolated from each other. The term "disposed to be isolated from each other" means a state where microparticles closest to each other are separated by a distance of equal to or greater than 1 nm. It is more preferable that the distance between closest microparticles of microparticles disposed to be isolated is equal to or greater than 10 nm.

There may be comprised a high-refractive index layer that has a third refractive index greater than the first refractive index between the transparent substrate and the metal-microparticle-containing layer.

Further, another layer may be provided between the transparent substrate, the metal-microparticle-containing layer, and the dielectric layer and on a surface side opposite to the substrate of the dielectric layer.

It is preferable that an area ratio between the plurality of metal microparticles and the metal-microparticle-containing layer in plan view is equal to or greater than 5% and equal to or less than 70%.

In the anti-reflection optical member of the present invention, it is preferable that a transmittance of the incident light is equal to or greater than 80%.

In the anti-reflection optical member of the present invention, it is preferable that a wavelength bandwidth, at which a reflectance of the incident light is equal to or less than 0.5%, is equal to or greater than 100 nm.

According to the anti-reflection optical member of the present invention, the metal-microparticle-containing layer functions as an adjustment layer with a refractive index, whereby it is possible to achieve a low reflectance. Further, at least 60% of all the plurality of metal microparticles included in the metal-microparticle-containing layer are flat metal particles each of which has a ratio of diameter to thickness of equal to or greater than 3, and the main flat surfaces of the flat metal particles are oriented in a plane at in a range of 0° to 30° to the surface of the metal-microparticle-containing layer. Therefore, an absorbance of the metal microparticle-containing layer with respect to visible light is far lower compared with a case where spherical metal microparticles are provided. Accordingly, it is possible to obtain an extremely high transmittance with respect to visible light.

DESCRIPTION OF THE PREFERRED EMBODIMENTS

Hereinafter, embodiments of the present invention will be described.

Figure 1:
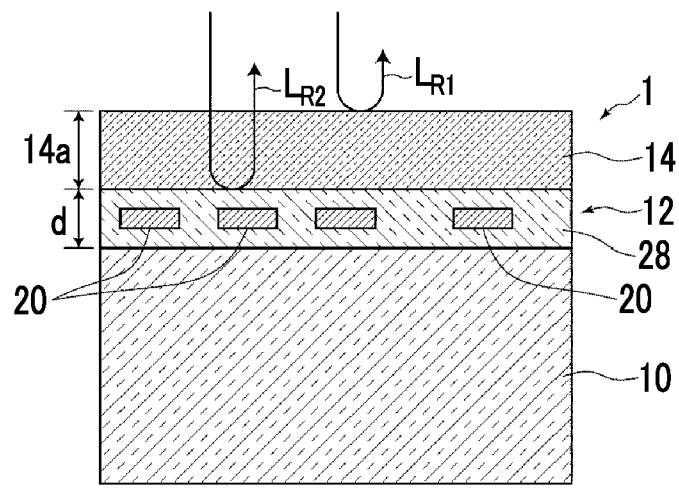
FIG. 1 is a schematic view illustrating an example of an anti-reflection optical member according to a first embodiment of the present invention.
Figure 2:
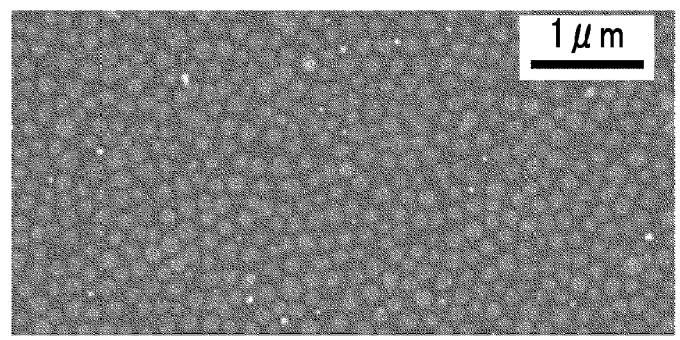
FIG. 2 shows a SEM image of a metal-microparticle-containing layer in plan view.

FIG. 1 is a schematic sectional view illustrating a configuration of an anti-reflection optical member 1 of a first embodiment of the present invention. FIG. 2 shows an image of a scanning microscope of a metal-microparticle-containing layer 12 of the anti-reflection optical member 1 in plan view. As shown in FIG. 1, the anti-reflection optical member 1 of the present embodiment is an anti-reflection optical member that prevents incident light with a predetermined wavelength from being reflected and is used in a predetermined medium. The anti-reflection optical member 1 has a laminated structure in which the following are laminated in this order: a transparent substrate 10 that has a first refractive index $n_1$ greater than a refractive index $n_0$ of a medium; a metal-microparticle-containing layer 12 that contains a plurality of metal microparticles 20; and a dielectric layer 14 that has a second refractive index $n_2$ greater than the refractive index $n_0$ of the medium.

At least 60% of all the plurality of metal microparticles 20 included in the metal-microparticle-containing layer 12 are flat metal particles each of which has a ratio of diameter to thickness (aspect ratio) equal to or greater than 3. Main flat surfaces of the flat metal particles are oriented in a plane at in a range of 0° to 30° to a surface of the metal-microparticle-containing layer. As shown in FIG. 2, in the metal-microparticle-containing layer 12, the plurality of metal microparticles 20 is disposed without forming a conductive path.

Further, a thickness 14*a* of the dielectric layer 14 is a thickness at which light $L_{R1}$ reflected on a surface of the dielectric layer 14 in a case where the incident light enters the laminated structure from the surface of the dielectric layer 14 interferes with and is canceled out by light $L_{R2}$ reflected on an interface between the dielectric layer 14 and the metal-microparticle-containing layer 12.

The anti-reflection optical member of the present invention may be a glass window to be subjected to an anti-reflection function, may be an anti-reflection film (film-like anti-reflection optical member) that is attached onto and used for the surface of the liquid crystal display or the like, and may be a lens of which a surface is subjected to the anti-reflection optical function.

The predetermined medium is a medium that fulfills a room used for the anti-reflection optical member, and is a medium such as air ($n_0=1$) or water ($n_0=1.33$), and a refractive index thereof is substantially equal to or less than 1.4. However, in accordance with the use of the anti-reflection optical member, a different predetermined medium is used. Thus, in the present invention, the predetermined medium is not limited to this. Accordingly, refractive indexes of the respective layers are appropriately set in accordance with the use applications (media for the used room).

The incident light with the predetermined wavelength is light with a wavelength to which anti-reflection applies, and can be arbitrary set in accordance of the purpose. However, for example, in a case of using the light for anti-reflection of the liquid crystal display or the like, visible light (380 nm to 780 nm) with eye visibility is used.

Further, in the anti-reflection effect, for example, in a case of using the light for anti-reflection of the liquid crystal display or the like, it is preferable that a wavelength region, in which a reflectance is equal to or less than 0.5%, is in a range of 100 nm or more.

Elements of the optical member of the present invention will be described in detail.

<Transparent Substrate>

The transparent substrate 10 is not particularly limited if it is optically transparent to the incident light with the predetermined wavelength having a first refractive index $n_1$ greater than a refractive index $n_0$ of the predetermined medium, and may be appropriately set in accordance with the purpose. For example, the wavelength to which anti-reflection applies may be in the visible light region. In this case, a transmittance of the transparent substrate is equal to or greater than 70, and is preferably equal to or greater than 80%. In a case where the wavelength to which anti-reflection applies is in the near-infrared region, it is preferable that a transmittance of the substrate is high in the near-infrared region.

It is preferable that the first refractive index $n_1$ is greater than the refractive index $n_0$ of the predetermined medium. However, as a difference in refractive index is large, a degree of reflection of light incident onto the transparent substrate is large, and thus the necessity of anti-reflection increases. Accordingly, the present invention is effective in a case where the difference in refractive index is equal to or greater than 12% of the refractive index of the predetermined medium. In particular, the present invention is more effective in a case where the difference is equal to or greater than 20% of the refractive index. Particularly, in a case where the predetermined medium is air and $n_0=1$, the difference in refractive index is large, and thus the present invention is effective. Further, it is preferable that the refractive index of the transparent substrate is less than 1.8.

Regarding the transparent substrate 10, the shape, the structure, the size, the material, and the like are not particularly limited, and may be appropriately selected in accordance with the purpose thereof.

Examples of the shape include a film shape, a plate shape, and the like. The structure may be a single layer structure, and may be a laminated structure. It is preferable that the size is set in accordance with the use.

Examples of the transparent substrate material include a film formed of the following or a laminated film formed by laminating the following: glass, polyethylene, polypropylene, poly4-methylpentene-1, polyolefin resins such as polybutene-1; polyethylene terephthalate, polyester resins such as polyethylene naphthalate; polycarbonate resins, polyvinyl chloride resins, polyphenylene sulfide resins, polyether sulfone resins, polyethylene sulfide resins, polyphenylene ether resins, styrene resins, acrylic resins, polyamide resins, polyimide resins, cellulose resins such as cellulose acetate, or the like. Among those, especially, a triacetyl cellulose (TAC) film, or a polyethylene terephthalate (PET) film is appropriate.

When the transparent substrate 10 has a plate shape or a film shape, the thickness thereof is not particularly limited, and may be appropriately selected in accordance of the intended use of anti-reflection. In the case of the film shape, the thickness is generally in a range of 10 μm to 500 μm. The thickness of the transparent substrate 10 is preferably in a range of 10 μm to 100 μm, more preferably in a range of 20 μm to 75 μm, and especially preferably in a range of 35 μm to 75 μm. As the thickness of the transparent substrate 10 is larger, adhesion failure is less likely to occur. Further, as the thickness of the transparent substrate 10 is smaller, when the substrate is attached as an anti-reflection film onto a building material or a window glass of a vehicle, adhesiveness thereof is not too strong to use the substrate as a material, and it is easier to use the substrate. Furthermore, as the transparent substrate 10 becomes sufficiently thin, the transmittance increases, and thus the raw material costs tend to be reduced.

<Metal-Microparticle-Containing Layer>

The metal-microparticle-containing layer 12 is a layer that contains the plurality of metal microparticles 20 in a binder 28. In the present embodiment, as shown in FIG. 2, in plan view, the metal microparticles are randomly (non-periodically) arranged in the layer.

—Metal Microparticles—

As described above, at least 60% of all the plurality of metal microparticles 20 included in the metal-microparticle-containing layer 12 are flat metal particles (metal particles having plate shapes) each of which has two main flat surfaces opposite to each other. In addition, it is preferable that at least 65% or 70% of metal microparticles are flat metal particles. Further, it is preferable that the flat metal particles 20 are biased to one surface of the metal-microparticle-containing layer 12.

If a ratio of the flat metal particles to the metal microparticles is equal to or greater than 60%, a transmittance of visible light increases. The flat metal particles are not particularly limited if each particle has the two main flat surfaces opposite to each other. However, examples of the shape of the main flat surface include a hexagonal shape, a triangular shape, a circular shape, and the like. In order to increase the transmittance of visible light, among the shapes, it is preferable that the shape of the main flat surface is a hexagonal shape shown in FIG. 3, a polygonal shape of which the number of sides is equal to or greater than six, or a circular shape shown in FIG. 4.

In the present description, the circular shape is defined as a shape of which the number of sides having lengths equal to or greater than 50% of an average circle-equivalent diameter of the flat metal particle to be described later is 0 per one flat metal particle. The flat metal particle having a circular shape is not particularly limited if the shape is rounded without a corner when the flat metal particle is observed from the upper side of the main flat surface through a transmission electron microscope (TEM).

In the present description, the hexagonal shape is defined as a shape of which the number of sides having lengths equal to or greater than 20% of an average circle-equivalent diameter of the flat metal particle to be described later is 6 per one flat metal particle. The flat metal particle having a hexagonal shape is not particularly limited if the shape is hexagonal when the flat metal particle is observed from the upper side of the main flat surface through a transmission electron microscope (TEM), and may be appropriately selected in accordance with the purpose. For example, the corners of the hexagonal shape may have acute angles, or may be rounded. However, in order to reduce absorption of a visible light region, it is preferable that the corners are rounded. A degree of rounding of the corner is not particularly limited, and may be appropriately selected in accordance with the purpose.

[Average Particle Diameter (Average Circle-Equivalent Diameter) and Variation Coefficient]

The circle-equivalent diameter is represented as a diameter of a circle having an area equal to a projected area of each particle. The projected area of each particle can be obtained by a well-known method of measuring the area on an electron micrograph and performing correction thereon with a magnification of imaging. Further, the average particle diameter (average circle-equivalent diameter) is an arithmetic mean value which is calculated from the particle size distribution (size distribution) obtained by statics of circle-equivalent diameters D of 200 flat metal particles. The variation coefficient in the size distribution of the flat metal particles is a value (%) which is obtained by dividing the standard deviation of the size distribution by the above-mentioned average particle diameter.

In the anti-reflection optical member of the present invention, the variation coefficient in the size distribution of the flat metal particles is preferably equal to or less than 35%, more preferably equal to or less than 30%, and especially preferably equal to or less than 20%. In order to reduce absorption of visible light in the anti-reflection structure, it is preferable that the variation coefficient is equal to or less than 35%.

The sizes of the flat metal particles are not particularly limited, and may be appropriately selected in accordance with the purpose. The average particle diameter is preferably in a range of 10 nm to 500 nm, more preferably in a range of 20 nm to 300 nm, and yet more preferably in a range of 50 nm to 200 nm.

[Thickness and Aspect Ratio of Flat Metal Particle]

In the anti-reflection optical member of the present invention, a thickness T of the flat metal particle is preferably equal to or less than 20 nm, more preferably in a range of 2 nm to 15 nm, and especially preferably in a range of 4 nm to 12 nm.

Figure 3:
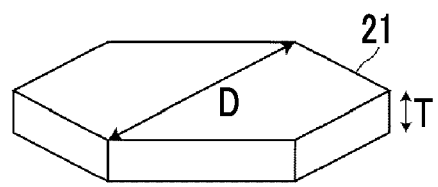
FIG. 3 is a schematic view illustrating an example of a flat metal particle.
Figure 4:
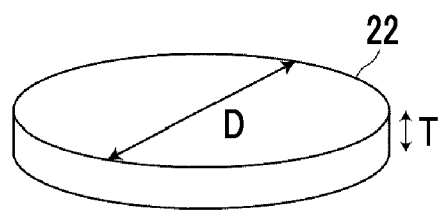
FIG. 4 is a schematic view illustrating another example of a flat metal particle.

The particle thickness T is equivalent to a distance between the main flat surfaces of the flat metal particle, and is, for example, as shown in FIGS. 3 and 4. The particle thickness T can be measured through an atomic force microscope (AFM) or a transmission electron microscope (TEM).

Examples of a method of measuring the average particle thickness using the AFM include a method of dropping a particle dispersion liquid containing the flat metal particles onto the glass substrate, drying the substrate, and measuring a thickness of a single particle.

Examples of the method of measuring the average particle thickness using the TEM include the following method and the like. The particle dispersion liquid containing the flat metal particles is dropped onto a silicon substrate, the substrate is dried, a covering process is performed through carbon deposition and metal deposition, cross-sectional slices are created through focused ion beam (FIB) processing, and the sectional surfaces are observed through the TEM, whereby the thicknesses of the particles are measured.

In the present invention, a ratio D/T (aspect ratio) of the diameter (average circle-equivalent diameter) D and the average thickness T of the flat metal particles 20 is not particularly limited if the ratio is equal to or greater than 3, and may be appropriately selected in accordance with the purpose. However, in order to reduce haze and absorption of visible light, the ratio is preferably in a range of 3 to 40, and more preferably in a range of 5 to 40. If the aspect ratio is equal to or greater than 3, it is possible to prevent visible light from being absorbed. If the ratio is less than 40, it is also possible to prevent haze from occurring in the visible region.

Figure 5:
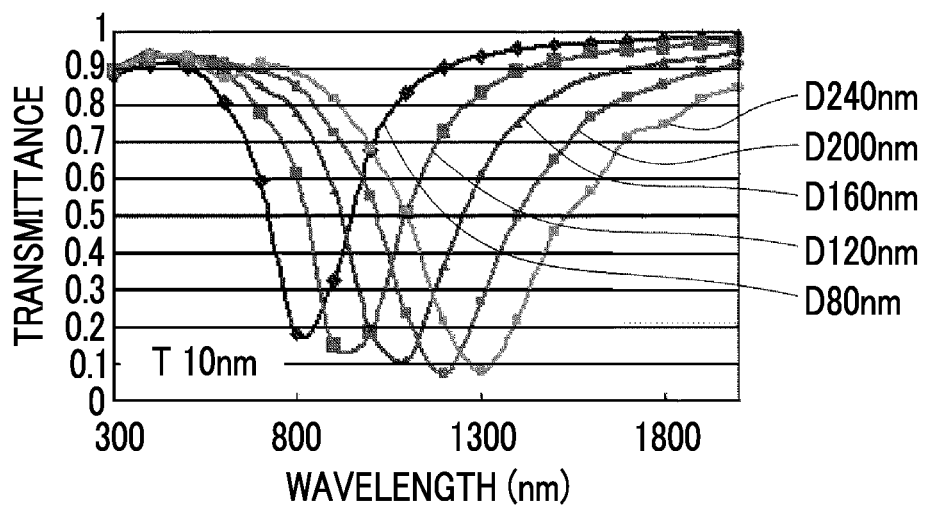
FIG. 5 is a diagram illustrating a simulation of wavelength dependency of transmittance of each aspect of the flat metal particle.

FIG. 5 shows a simulation result of wavelength dependency of the transmittance in a case where the aspect ratio of the circular shape metal particle changes. A study was made on cases of changing the diameter D to 80 nm, 120 nm, 160 nm, 200 nm, and 240 nm when the thickness T of the circular metal particle is set to 10 nm. As shown in FIG. 5, the larger the aspect ratio, the longer wavelength side an absorption peak (the bottom of the transmittance) appearing in a plasmon resonance wavelength shifts to, and the smaller the aspect ratio, the shorter wavelength side the absorption peak shifts to. If the aspect ratio is less than 3, the absorption peak is close to the visible region. If the aspect ratio is 1, the absorption peak is in the visible region. As described above, if the aspect ratio is equal to or greater than 3, it is possible to improve the transmittance of visible light. In particular, it is preferable that the aspect ratio is equal to or greater than 5.

[Plane Orientation]

In the metal-microparticle-containing layer 12, the main surfaces of the flat metal particles are oriented in a plane at in a range of 0° to 30° to the surface of the metal-microparticle-containing layer 12. That is, in FIG. 6, angles (±θ) are in a range of 0° to 30°. The angles (±θ) are formed between the surface of the metal-microparticle-containing layer 12 and the main flat surfaces (surfaces that define the circle-equivalent diameter D) of the flat metal particles 20 or extended planes of the main flat surfaces. The plane orientation is set at angles (±θ) more preferably in a range of 0° to 20°, and especially preferably in a range of 0° to 10°.

Figure 6:
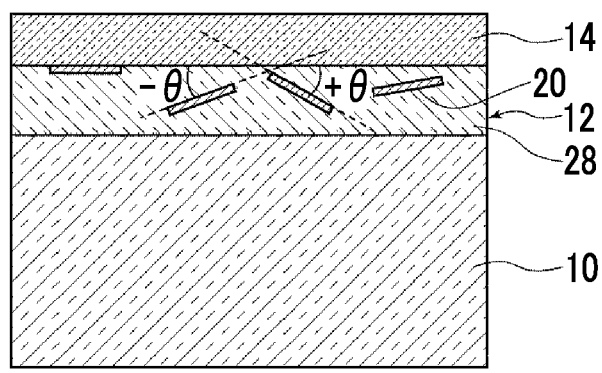
FIG. 6 is a schematic sectional view illustrating a state where the metal-microparticle-containing layer including the flat metal particles is present in the anti-reflection optical member of the present invention, and is a diagram illustrating angles (θ) formed between the metal-microparticle-containing layer (also parallel with a plane of a substrate) including flat metal particles and the main flat surfaces (each surface defining a circle-equivalent diameter D) of the flat metal particles.

When the section of the anti-reflection optical member is observed, it is more preferable that the flat metal particles 20 are oriented in a state where inclination angles (±θ) shown in FIG. 6 are smaller. If θ is greater than ±30°, there is a concern about an increase in absorption of visible light in the anti-reflection optical member.

Further, the number of flat metal particles, which are oriented in a plane at the above-mentioned angles θ in a range of 0° to ±30°, are preferably equal to or greater than 50% of the number of all the flat metal particles, more preferably equal to or greater than 70%, and yet more preferably equal to or greater than 90%.

Whether or not the main flat surfaces of the flat metal particles are oriented in a plane to one surface of the metal-microparticle-containing layer can be determined by, for example, the following method. An appropriate sectional piece is fabricated, and the metal-microparticle-containing layer and the flat metal particles of the sectional piece are observed and evaluated. Specifically, the method includes the following method and the like. A section sample or a sectional piece sample of the anti-reflection optical member is fabricated using a microtome and a focused ion beam (FIB), and is evaluated from an image which is obtained through observation using various microscopes (such as a field emission scanning electron microscope (FE-SEM) and a transmission electron microscope (TEM)).

The method of observing the section sample or the sectional piece sample, which is fabricated as described above, is not particularly limited if it is possible to check whether the main flat surfaces of the flat metal particles are oriented in a plane to one surface of the metal-microparticle-containing layer in the sample. The examples of the method include a method using the FE-SEM, the TEM, or the like. The observation may be performed through the FE-SEM in the case of the section sample, and may be performed through the TEM in the case of the sectional piece sample. In the case where the evaluation is performed using the FE-SEM, it is preferable that the FE-SEM has a spatial resolving power capable of clearly defining the inclination angles (±θ in FIG. 6) and the shapes of the flat metal particles.

The material of the metal microparticles is not particularly limited, and may be appropriately selected in accordance with the purpose. However, it is preferable that the material is silver, gold, aluminum, copper, rhodium, nickel, platinum, indium tin oxide (ITO), titanium, an alloy thereof, or the like in that the reflectance of the heat rays (near-infrared rays) is high. Further, gold, copper, and the like have high absorptivities to visible light. Accordingly, in order to improve the transmittance of visible light, it is most preferable to use silver of which an absorptivity of visible light is small.

The state of distribution of the metal microparticles 20 is not particularly limited if a conductive path is not formed by the plurality of metal microparticles.

Figure 7A:
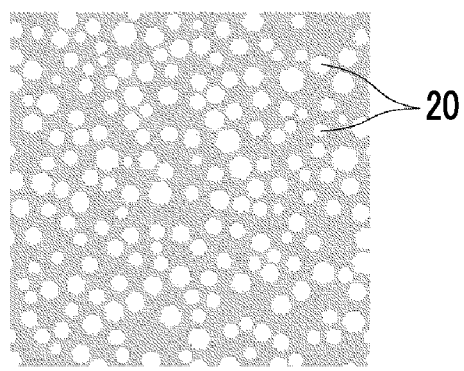
FIG. 7A is a diagram illustrating a distribution state (100% isolation) of the metal microparticles in the metal-microparticle-containing layer.
Figure 7B:
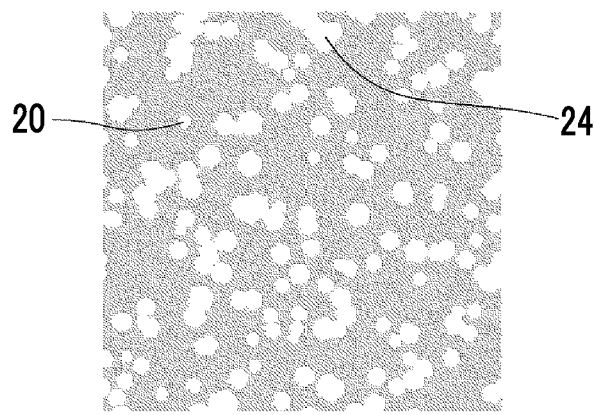
FIG. 7B is a diagram illustrating a distribution state (50% isolation) of the metal microparticles in the metal-microparticle-containing layer.
Figure 7C:
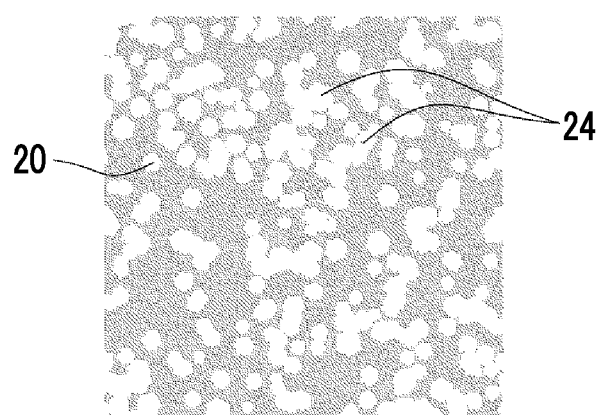
FIG. 7C is a diagram illustrating a distribution state (10% isolation) of the metal microparticles in the metal-microparticle-containing layer.
Figure 7D:
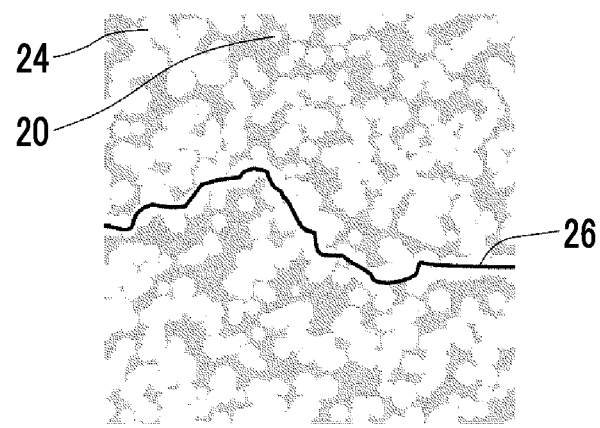
FIG. 7D is a diagram illustrating a distribution state (2% isolation) of the metal microparticles in the metal-microparticle-containing layer.

FIGS. 7A to 7D are plan views schematically illustrating states of distribution of the metal microparticles 20 in the metal-microparticle-containing layer 12. In the drawing, the white portions are the metal microparticles 20. In FIG. 7A, the plurality of metal microparticles 20 is distributed to be entirely (100%) isolated in a plane direction. FIG. 7B shows a state where 50% of the plurality of metal microparticles 20 are isolated and the other 50% of the microparticles are distributed in contact with adjacent particles in a partially connected state 24. FIG. 7C shows a state where only 10% of the plurality of metal microparticles 20 are isolated and the other microparticles are distributed in contact with adjacent particles in a partially connected state 24. As shown in FIG. 7A, it is most preferable that the metal microparticles 20 are isolated from each other. However, if at least 10% microparticles are disposed to be isolated, it is possible to sufficiently obtain an anti-reflection effect. On the other hand, FIG. 7D shows distribution of the metal microparticles in a case where only 2% of the plurality of metal microparticles 20 are isolated. In FIG. 7D, the metal microparticles are connected in a range from one end to the other end of the image, thereby forming a conductive path 26. As described above, if the conductive path 26 is formed, the absorptivity at a wavelength in the visible light region is increased by the metal microparticles, and the reflectance is also increased. Accordingly, in the present invention, as shown in FIGS. 7A to 7C, it is necessary to achieve at least the state where the conductive path is not formed by the metal particles.

In addition, whether or not the conductive path is formed is determined as follows. In a case where the metal microparticles are continuously connected in a range from one end of a region of 2.5 μm×2.5 μm observed through the SEM and to the other end opposed thereto, a conductive path is considered to be formed. In a case where the metal microparticles are disconnected in mid-course, a conductive path is considered to be not formed.

[Thickness of Metal-Microparticle-Containing Layer and Area Where Metal Microparticles Are Present]

Figure 8:
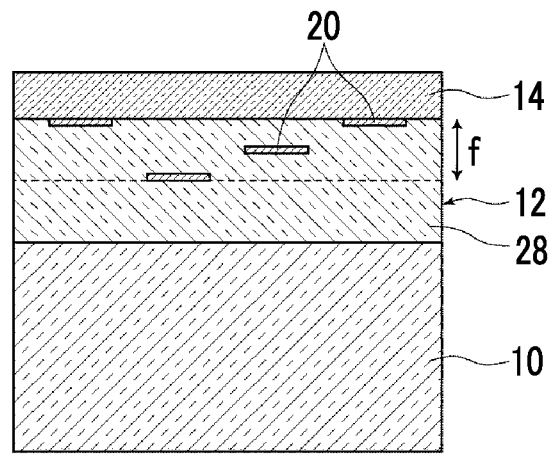
FIG. 8 is a schematic sectional view illustrating a state where the metal-microparticle-containing layer including the flat metal particles is present in the anti-reflection optical member of the present invention, and is a diagram illustrating a region in which flat metal particles are distributed in a depth direction of an anti-reflection structure of the metal-microparticle-containing layer.
Figure 9:
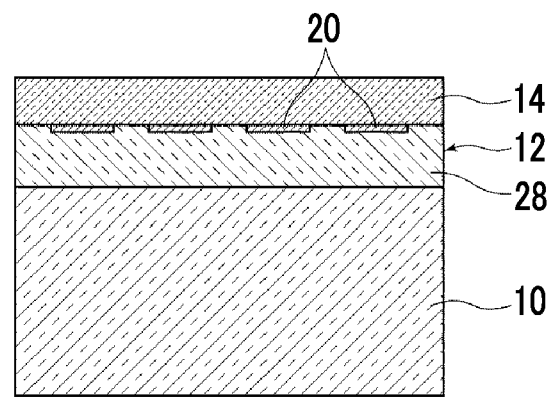
FIG. 9 is a schematic sectional view illustrating another example of a state where the metal-microparticle-containing layer including the flat metal particles is present in the anti-reflection optical member of the present invention.

FIGS. 8 and 9 are schematic sectional views illustrating states where the metal microparticles 20 are present in the metal-microparticle-containing layer 28, in the anti-reflection optical member of the present invention.

In the anti-reflection optical member of the present invention, a coating film thickness d of the metal-microparticle-containing layer 12 is preferably equal to or less than 100 nm, more preferably in a range of 3 nm to 50 nm, and especially preferably in a range of 5 nm to 40 nm. The reason for this is as follows. As a coating thickness decreases, an angular range of plane orientation of the flat metal particles tends to be closer to 0°, and thus it is possible to reduce absorption of visible light.

In a case where the coating film thickness d of the metal-microparticle-containing layer 12 and the average circle-equivalent diameter D of the flat metal particle satisfy d>D/2, at least 80% of the flat metal particles are preferably present at in a range of d/2 from the surface of the metal-microparticle-containing layer, and more preferably present at in a range of d/3. In addition, it is yet more preferable that at least 60% of the flat metal particles are exposed on one surface of the metal-microparticle-containing layer. The flat metal particles are present in the range of d/2 from the surface of the metal-microparticle-containing layer, this means that at least some of the flat metal particles are included in the range of d/2 from the surface of the metal-microparticle-containing layer. FIG. 8 is a schematic diagram illustrating the case where the thickness d of the metal-microparticle-containing layer satisfies d>D/2, and a diagram in which at least 80% of the flat metal particles are included in a range off and f<d/2 is satisfied.

Further, the flat metal particles are exposed on one surface of the metal-microparticle-containing layer, this means that a part of one surface of each flat metal particle is positioned at the interface between the layer and the dielectric layer. FIG. 9 is a diagram illustrating a case where one surface of each flat metal particle coincides with the interface between the metal-microparticle-containing layer and the dielectric layer.

Here, the distribution of the flat metal particles, which are present in the metal-microparticle-containing layer, can be measured from, for example, the image which is obtained by observing the section of the anti-reflection optical member through the SEM.

In the anti-reflection optical member of the present invention, the coating film thickness d of the metal-microparticle-containing layer and the average circle-equivalent diameter D of the flat metal particle preferably satisfy d<D/2, more preferably satisfy d<D/4, and yet more preferably satisfy d<D/8. As the coating thickness of the metal-microparticle-containing layer decreases, the angular range of plane orientation of the flat metal particles tends to be closer to 0°, and thus it is possible to reduce absorption of visible light.

The plasmon resonance wavelength $\lambda$ (absorption peak wavelength in FIG. 5) of the flat metal particles in the metal-microparticle-containing layer is not particularly limited so far as the wavelength $\lambda$ is longer than a wavelength to which anti-reflection applies as a predetermined wavelength, and may be appropriately selected in accordance with the purpose. However, in order to block heat rays, it is preferable that the wavelength $\lambda$ is in a range of 700 nm to 2,500 nm.

[Area Ratio of Metal Microparticles]

The area ratio [(B/A)×100] is a ratio of a sum B of the areas of the metal microparticles to an area A of the substrate obtained when the anti-reflection optical member is viewed from the top (total projected area A of the metal-microparticle-containing layer obtained when the layer is viewed in a vertical direction to the metal-microparticle-containing layer). The area ratio is preferably equal or greater than 5%, and more preferably equal to or greater than 10% and less than 70%. If the area ratio is equal or greater than 5%, it is possible to sufficiently obtain the anti-reflection effect. If the area ratio is less than 70%, it is possible to suppress deterioration in transmittance by minimizing absorption and reflection of visible light without forming a conductive path.

In order to decrease a reflectance in a wide wavelength region, it is preferable that the area ratio is set as an optimal value, depending on the thickness T of the flat metal particle and the refractive index $n_2$ of the dielectric layer. A study was made on a case where all the metal microparticles are flat metal particles and the predetermined medium is air ($n_0$=1). For example, when the thicknesses of the flat metal particles are 4 nm and the refractive index of the dielectric layer is 1.4, the area ratio is preferably equal to or greater than 40% and less than 70%, and more preferably equal to or greater than 50% and less than 65%. Further, for example, in a case where the thicknesses of the flat metal particles are 8 nm and the refractive index of the dielectric layer is 1.4, the area ratio is preferably equal to or greater than 5% and less than 40%, and more preferably equal to or greater than 6% and less than 30%. Furthermore, for example, in a case where the thicknesses of the flat metal particles are 18 nm and the refractive index of the dielectric layer is 1.4, the area ratio is preferably equal to or greater than 5% and less than 30%, and more preferably equal to or greater than 5% and less than 25%.

Here, the area ratio can be measured by performing image processing on, for example, an image, which is obtained by observing the anti-reflection optical member from the top through the SEM, and an image which is obtained by performing observation through the atomic force microscope (AFM).

[Arrangement of Flat Metal Particles]

It is preferable that arrangement of the flat metal particles in the metal-microparticle-containing layer is uniform. Uniformity of arrangement described herein indicates the following: when a distance (distance between the closest particles) from each particle to the particle closest thereto is set as a numerical value on the basis of a distance between the centers of the particles, a variation coefficient (=standard deviation÷average value) of the distance between each particle and the particle closest thereto is small. The smaller the variation coefficient of the distance between the closest particles, the better. The variation coefficient is preferably equal to or less than 30%, more preferably equal to or less than 20%, yet more preferably equal to or less than 10%, and ideally equal to 0%. In a case where the variation coefficient of the distance between the closest particles is large, the flat metal particles are densely arranged or the particles aggregate in the metal-microparticle-containing layer, and haze tends to deteriorate. For this reason, the above-mentioned case is not preferable. The distance between the closest particles can be measured by observing a coated surface of the metal-microparticle-containing layer through the SEM or the like.

Further, the boundary between the metal-microparticle-containing layer and the dielectric layer can be determined through observation using the SEM or the like, and thus it is possible to determine the thickness d of the metal-microparticle-containing layer. Furthermore, even in a case where the dielectric layer is formed on the metal-microparticle-containing layer by using a polymer having the same type as a polymer included in the metal-microparticle-containing layer, generally the boundary between the dielectric layer and the metal-microparticle-containing layer can be determined on the basis of the image which is observed through the SEM, and the thickness d of the metal-microparticle-containing layer can be determined. In addition, in a case where the boundary is unclear, the surface of the flat metal positioned to be farthest from the substrate is regarded as the boundary.

[Method of Synthesizing Flat Metal Particles]

A method of synthesizing the flat metal particles is not particularly limited, and may be appropriately selected in accordance with the purpose. Examples of the method of the flat metal particles having the hexagonal and circular shapes and the like include liquid phase methods such as a chemical reduction method, a photochemical reduction method, and an electrochemical reduction method. Among those, in terms of shape and size control, it is especially preferable to use the liquid phase method such as the chemical reduction method or the photochemical reduction method. After the flat metal particles having the hexagonal to triangular shapes are synthesized, for example, an etching process using dissolution species such as nitric acid and sodium sulfite for dissolving silver, and an aging process using heating are performed, whereby it is possible to round the corners of the flat metal particles having the hexagonal to triangular shapes. In such a manner, the flat metal particles having the hexagonal to circular shapes may be obtained.

As the method of synthesizing the flat metal particles, the following may be applied: seed crustal is fixed in advance onto the surface of the transparent substrate such as a film or a glass substrate, and thereafter metal particles (for example Ag) are crystal-grown on a flat plate.

In the anti-reflection optical member of the present invention, in order to obtain desired characteristics, the flat metal particles may be further processed. Examples of the process further performed include a process of forming a high-refractive index shell layer, a process of adding various additives such as a dispersant and an antioxidant, and the like.

—Binder—

The binder 28 in the containing layer 12 preferably includes a polymer, and more preferably includes a transparent polymer. Examples of the polymer include polymers such as polyvinyl acetal resins, polyvinyl alcohol resins, polyvinyl butyral resins, polyacrylate resins, polymethyl methacrylate resins, polycarbonate resins, polyvinyl chloride resins, (saturated) polyester resins, polyurethane resins, and natural polymers such as gelatin and cellulose. Among those, it is preferable that a main polymer is a polyvinyl alcohol resin, a polyvinyl butyral resin, a polyvinyl chloride resin, a (saturated) polyester resin, or a polyurethane resin. It is more preferable that the main polymer is a polyester resin and a polyurethane resin in that at least 80% of the flat metal particles are easily set to be present in the range of d/2 from the surface of the metal-microparticle-containing layer.

Among the polyester resins, it is especially more preferable that the main polymer is a saturated polyester resin in that the resin has excellent weatherability since no double bond is included therein. Further, it is yet more preferable that the main polymer has a hydroxyl group or a carboxyl group at molecular ends in that it is possible to obtain high hardness, durability, and heat resistance by curing the polymer with a water-soluble and water-dispersible curing agent or the like.

As the polymer, a commercially available polymer may be preferably used. Examples of the polymer include PLAS COAT Z-687 which is a water-soluble polyester resin produced by GOO CHEMICAL Co., Ltd, and the like.

Further, in the present description, the main polymer included in the metal-microparticle-containing layer is defined as a polymer component that occupies at least 50 mass % of the polymer included in the metal-microparticle-containing layer.

Content ratios of the polyester resin and the polyurethane resin to the metal microparticles included in the metal-microparticle-containing layer are preferably in a range of 1 mass % to 10000 mass %, more preferably in a range of 10 mass % to 1000 mass %, and especially preferably in a range of 20 mass % to 500 mass %.

The refractive index n of the binder is preferably in a range of 1.4 to 1.7.

<Dielectric Layer>

As described above, the thickness 14a of the dielectric layer 14 is a thickness at which reflected light $L_{R1}$ reflected on the dielectric layer 14 of the incident light from the surface of the dielectric layer 14 interferes with and is canceled out by reflected light $L_{R2}$ of the incident light L reflected on the metal-microparticle-containing layer 12. Here, the term "the reflected light $L_{R1}$ interferes with and is canceled out by the reflected light $L_{R2}$ of the incident light L reflected on the metal-microparticle-containing layer 12" means that the reflected light $L_{R1}$ and the reflected light $L_{R2}$ interferes with each other and the reflected light is reduced as a whole. Thus, the meaning is not limited to a case where the reflected light is completely eliminated.

It is preferable that a thickness 14a of the dielectric layer 14 is equal to or less than 400 nm. It is preferable that the thickness of the dielectric layer is a thickness which is equal to or less than an optical path length $\lambda/4$ when the predetermined wavelength is set as $\lambda$.

Theoretically, an optimal thickness of the dielectric layer 14 is an optical path length of $\lambda/8$, but an optimal value thereof varies in a range of $\lambda/16$ to $\lambda/4$, depending on a condition of the metal-microparticle-containing layer. Thus, it is preferable that the optimal value is appropriately set in accordance with a layer configuration.

The constituent materials of the dielectric layer 14 are not particularly limited if each material has a second refractive index which is greater than a refractive index of a predetermined medium. For example, the materials contain a binder, a matting agent, an ultraviolet absorbent, an antistatic agent, and a surfactant, and further contain other components as necessary. The binder is not particularly limited, and may be appropriately selected in accordance with the purpose. The examples of the binder include thermosetting or light-curable resins such as acrylic resins, silicone resins, melamine resins, urethane resins, alkyd resins, and fluorine resins.

<Other Layer Components>

The anti-reflection optical member of the present invention may include a layer other than the above-mentioned layer.

[Infrared-Absorption-Compound-Containing Layer]

In order to block heat rays, the anti-reflection optical member of the present invention may have an infrared-absorption-compound-containing layer that contains a compound which is absorptive in the infrared region. Hereinafter, the layer containing the compound, which is absorptive in the infrared region, is also referred to as the infrared-absorption-compound-containing layer. In addition, the infrared-absorption-compound-containing layer may serve as a layer having another function.

[Pressure Sensitive Adhesive Layer]

It is preferable that the anti-reflection optical member of the present invention has a pressure sensitive adhesive layer (hereinafter referred to as a pressure sensitive layer). The pressure sensitive layer may include an ultraviolet absorbent.

The material, which can be used to form the pressure sensitive layer, is not particularly limited, and may be appropriately selected in accordance with the purpose. Examples of the material may include polyvinyl butyral (PVB) resins, acryl resins, styrene/acryl resins, urethane resins, polyester resins, silicone resins, and the like. Among those, one material may be used, and two or more materials may be used in combination. The pressure sensitive layer made of such materials may be formed through coating or lamination.

Furthermore, an antistatic agent, a lubricant, an anti-blocking agent, and the like may be added to the pressure sensitive layer.

The thickness of the pressure sensitive layer is preferably in a range of 0.1 µm to 10 µm.

[Hard Coat Layer]

In order to add abrasion resistance, it is also appropriate that a hard coat layer having a hard coat property is included. The hard coat layer may include metallic oxide particles or an ultraviolet absorbent.

The hard coat layer is not particularly limited, and a type thereof and a method of forming the layer may be appropriately selected in accordance with the purpose. The examples of the material thereof include thermosetting or light-curable resins such as acrylic resins, silicone resins, melamine resins, urethane resins, alkyd resins, and fluorine resins. The thickness of the hard coat layer is not particularly limited, and may be appropriately selected in accordance with the purpose, but is preferably in a range of 1 µm to 50 µm.

[Back Coat Layer]

On the other hand, in the anti-reflection optical member of the present invention, a back coat layer may be provided on the surface opposite to the metal-microparticle-containing layer of the transparent substrate 10. The back coat layer is not particularly limited, and may be appropriately selected in accordance with the purpose. However, the back coat layer may be a layer including a compound which is absorptive in the infrared region, and may be a layer containing metal oxide particles to be described later.

[Ultraviolet Absorbent]

It is preferable that the anti-reflection optical member of the present invention has a layer including an ultraviolet absorbent.

The layer containing the ultraviolet absorbent may be appropriately selected in accordance with the purpose, and may be a pressure sensitive layer. Further, the layer may be a layer between the pressure sensitive layer and the metal-microparticle-containing layer. In either case, it is preferable that the ultraviolet absorbent is added to a layer which is disposed on a side on which the metal-microparticle-containing layer is irradiated with sun light.

[Metallic Oxide Particles]

In order to block heat rays, the anti-reflection optical member of the present invention may contain at least one type of metallic oxide particles.

The material of the metallic oxide particles is not particularly limited, and may be appropriately selected in accordance with the purpose. Examples of the material may include tin-doped indium oxide (hereinafter abbreviated as "ITO"), antimony-doped tin oxide (hereinafter abbreviated as "ATO"), zinc oxide, zinc antimonate, titanium oxide, indium oxide, tin oxide, antimony oxide, glass ceramics, 6-lanthanum boride ($LaB_6$), cesium tungsten oxide ($Cs_{0.33}WO_3$, hereinafter abbreviated as "CWO"), and the like. Among those, ITO, ATO, CWO, and 6-lanthanum boride ($LaB_6$) are more preferable in that it is possible to form an anti-reflection structure having excellent wide absorptivity of heat rays in accordance with combination between itself and the flat metal particles. In addition, ITO is especially preferable in that at least 90% of infrared rays with wavelengths of equal to or greater than 1,200 nm are blocked and the transmittance of visible light is equal to or greater than 90%.

It is preferable that a volume mean particle diameter of primary particles of the metallic oxide particles is equal to or less than 0.1 μm in that the transmittance of visible light is not reduced.

The shapes of the metallic oxide particles are not particularly limited, and may be appropriately selected in accordance with the purpose. Examples of the shapes may include a spherical shape, a spiculate shape, a plate shape, and the like.

Next, a method of forming the layers will be described.

—1. Metal-Microparticle-Containing Layer Forming Method—

A method of forming the metal-microparticle-containing layer 12 is not particularly limited. For example, the method may include a method of performing plane orientation. The plane orientation may be performed in the following method: a method of coating a surface of a transparent substrate with a dispersion liquid (flat metal particle dispersion liquid) containing the flat metal particles by a dip coater, a die coater, a slit coater, a bar coater, a gravure coater, or the like; an LB film method; a self-assembly method; a method of spray coating; or the like.

In addition, in order to promote plane orientation, the flat metal particles may be applied, and thereafter pass through pressure rollers such as calendar rollers or laminating rollers.

—2. Dielectric Layer Forming Method—

It is preferable that the dielectric layer 14 is formed through coating. The coating method in this case is not particularly limited, and a well-known method may be used as the coating method. Examples of the method may include a method of applying the dispersion liquid containing the ultraviolet absorbent through a dip coater, a die coater, a slit coater, a bar coater, a gravure coater, or the like.

—3. Hard Coat Layer Forming Method—

It is preferable that the hard coat layer is formed through coating. The coating method in this case is not particularly limited, and a well-known method may be used as the coating method. Examples of the method may include a method of applying the dispersion liquid containing the ultraviolet absorbent through a dip coater, a die coater, a slit coater, a bar coater, a gravure coater, or the like.

—4. Pressure Sensitive Layer Forming Method—

It is preferable that the pressure sensitive layer is formed through coating. For example, the adhesive layer may be laminated on a surface of a lower layer such as a substrate, a metal-microparticle-containing layer, an ultraviolet light absorption layer, or the like. The coating method in this case is not particularly limited, and a well-known method may be used as the coating method.

A film, in which an adhesive agent is applied and dried on a peeling film, is fabricated in advance. A dried pressure sensitive adhesive layer can be laminated by laminating an adhesive surface of the film and the anti-reflection structure surface of the present invention. The lamination method in this case is not particularly limited, and a well-known method may be used as the lamination method.

[Window Glass]

In a case of applying functionality to a type of a window glass by using the anti-reflection optical member of the present invention, it is preferable that the adhesive agent is laminated on an inner side of the window glass or both sides of the window glass. When the anti-reflection optical member (anti-reflection film) is attached onto the window glass, the pressure sensitive adhesive layer is applied thereon, or is provided through lamination, a aqueous solution including a surfactant (mainly an anionic surfactant) is sprayed on the adhesive layer surface of the anti-reflection film and the window glass surface, and then the anti-reflection film may be provided on the window glass through the adhesive layer. Until water evaporates, the adhesive strength of the adhesive layer is low, and thus the position of the anti-reflection film can be adjusted on the glass surface. After the position at which the anti-reflection film is attached onto the window glass is determined, water remaining between the window glass and the anti-reflection film is swept out from the center of the glass toward the end thereof by using a squeegee, whereby it is possible to fix the anti-reflection film onto the window glass surface. In such a manner, the anti-reflection film can be provided on the window glass.

The functionality of the window glass may be applied in a way of heat or pressure lamination for mechanically attaching the anti-reflection optical member of the present invention onto a glass plate by using a laminating machine. There is provided a laminating machine in which the glass plate passes through a slit area between heat resistance rubber rollers or metal rollers overheated from the upper side or heat resistance rubber roller having a room temperature or heated from the lower side. The film is mounted on the glass plate such that the adhesive surface comes into contact with the glass surface, an upper roller of the laminating machine is set to be tightly pressed against the film, and then the film passes through the laminating machine. If an appropriate temperature for heating the rollers is selected on the basis of the type of the adhesive agent and the film is attached, adhesive force becomes strong, and the film can be attached without air bubbles. In a case where the film having a roll shape can be supplied, a tape-like film is continuously supplied to heating rollers from the upper side, and if the film has a wrap angle of about 90 degrees to the heating rollers, it becomes easy to attach the pressure sensitive layer of the film through preheating. Thus, both of bubble elimination and an increase in adhesive force can be high-dimensionally achieved.

Figure 10:
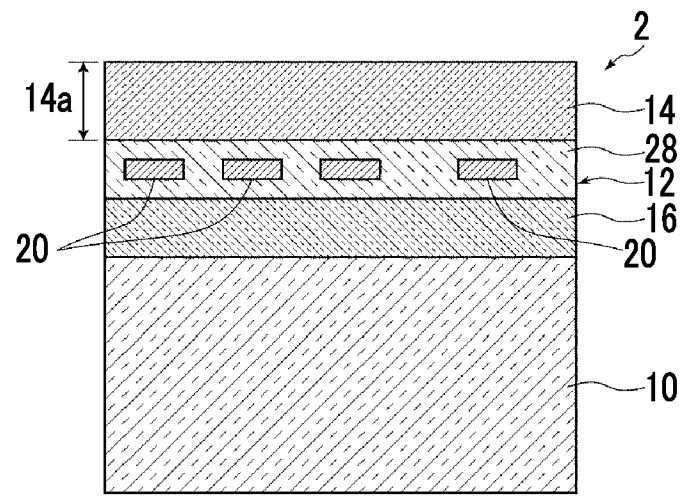
FIG. 10 is a schematic view illustrating an example of an anti-reflection optical member according to a second embodiment of the present invention.

FIG. 10 is a schematic sectional view of the anti-reflection optical member 2 of the second embodiment of the present invention. The anti-reflection optical member 2 of the present embodiment is different from the anti-reflection optical member 1 of the first embodiment in that a high-refractive index layer 16 having the refractive index $n_2$ greater than the refractive index $n_1$ of the transparent substrate 10 is provided between the transparent substrate 10 and the metal-microparticle-containing layer 12. The other components are the same as those of the first embodiment, and the same components are represented by the same reference numerals and signs.

By providing the high-refractive index layer 16 having the refractive index $n_2$ greater than the refractive index $n_1$ of the transparent substrate 10, it is possible to further improve the anti-reflection effect.

<High-Refractive Index Layer>

The refractive index of the high-refractive index layer 16 is preferably equal to or greater than 1.55, and especially preferably equal to or greater than 1.6.

The refractive index of the high-refractive index layer 16 is preferably greater than 1.55, and the constituent materials thereof are not particularly limited. For example, the materials contain a binder, metallic oxide microparticles, a matting agent, and a surfactant, and further contain other components as necessary. The binder is not particularly limited, and may be appropriately selected in accordance with the purpose. The examples of the binder include thermosetting or light-curable resins such as acrylic resins, silicone resins, melamine resins, urethane resins, alkyd resins, and fluorine resins.

The material of the metallic oxide microparticles is not particularly limited so far as metal microparticles having a refractive index greater than the refractive index of the binder are used, and may be appropriately selected in accordance with the purpose. Examples of the material may include tin-doped indium oxide (hereinafter abbreviated as "ITO"), zinc oxide, titanium oxide, zirconium oxide, and the like.

EXAMPLES

Hereinafter, examples and comparative examples of the present invention will be described.

First, preparation and evaluation of various application liquids used in manufacturing of the examples and the comparative examples will be described.

—Preparation of Flat Silver Particle Dispersion Liquid A1—

Ion-exchange water 13 L in a reaction container made by NTKR-4 (manufactured by Nippon Kinzoku Co., Ltd.) was measured, a trisodium citrate (anhydride) aqueous solution 1.0 L of 10 g/L was added thereto while the water was stirred by using a chamber including an agitator in which four propellers made by NTKR-4 and four paddles made by NTKR-4 are provided on a shaft made by SUS316L, and the water was kept warm at 35° C. Polystyrene sulfonate aqueous solution 0.68 L of 8.0 g/L was added, and a sodium borohydride aqueous solution 0.041 L prepared with 23 g/L by using a sodium hydroxide aqueous solution of 0.04 N was further added. A silver nitrate aqueous solution 13 L of 0.10 g/L was added at 5.0 L/min.

A trisodium citrate (anhydride) aqueous solution 1.0 L of 10 g/L and ion-exchange water 11 L were added, and a hydroquinone potassium sulfonate aqueous solution 0.68 L of 80 g/L was further added. A stirring speed was increased to 800 rpm, a silver nitrate aqueous solution 8.1 L of 0.10 g/L was added at 0.95 L/min, and thereafter the temperature thereof was decreased to 30° C.

A methyl hydroquinone aqueous solution 8.0 L of 44 g/L was added, and subsequently, a total amount of a gelatin aqueous solution of 40° C. to be described later was added. The stirring speed was increased to 1200 rpm, and a total amount of a sulfite silver white precipitate mixed liquid to be described later was added.

At the stage where pH change of the prepared liquid is stopped, NaOH aqueous solution 5.0 L of 1 N was added at 0.33 L/min. Thereafter, 2.0 g/L of 1-(m-sulfophenyl)-5-mercaptotetrazole sodium aqueous solution (adjusted to pH of 7.0±1.0 and dissolved by using NaOH and citric acid (anhydride)) 0.18 L was added, 1,2-benzisothiazolin-3-on (the aqueous solution of which an alkaline property was adjusted and which was dissolved by NaOH) 0.078 L of 70 g/L was further added. In such a manner, the flat silver particle dispersion liquid A1 was prepared.

—Preparation of Gelatin Aqueous Solution—

Ion-exchange water 16.7 L in a dissolution tank made by SUS316L was measured. Alkali-treated bovine bone gelatin (200,000 of GPC weight-average molecular weight) of 1.4 kg deionized was added while stirring was performed at a low speed by the agitator made by SUS316L. Further, alkali-treated bovine bone gelatin (21,000 of GPC weight-average molecular weight) of 0.91 kg, which was deionized, subjected to proteolytic enzyme treatment, and oxidized using hydrogen peroxide, was added. Thereafter, the temperature thereof was increased to 40° C., and swelling and dissolution of the gelatin were performed at the same time, and the gelatin was completely dissolved.

—Preparation of Sulfite Silver White Precipitate Mixed Liquid—

Ion-exchange water 8.2 L in the dissolution tank made by SUS316L was measured, and a silver nitrate aqueous solution 8.2 L of 100 g/L was added. While stirring is performed thereon at a high speed by the agitator made by SUS316L, a sodium sulfite aqueous solution 2.7 L of 140 g/L is added in a short time period, whereby a mixed liquid including a white precipitate of sulfite silver was prepared. This mixed liquid was prepared immediately before use.

—Preparation of Flat Silver Particle Dispersion Liquid B1—

The above-mentioned flat silver particle dispersion liquid A1 of 800 g is collected in a centrifuge tube, and its pH is adjusted to pH of 9.2±0.2 at 25° C. by using NaOH of 1N and/or a sulfuric acid of 1N. By using a centrifuge (HIMAC CR22GIII and ANGLE ROTOR R9A manufactured by Hitachi Kaki Co., Ltd.), the temperature of the liquid is set to 35° C., a centrifugal separation operation is performed at 9000 rpm for 60 minutes, and thereafter a supernatant of 784 g was discarded. An NaOH aqueous solution of 0.2 mM is added to the precipitated flat silver particles, a total weight thereof is 400 g, and a raw dispersion liquid was manually stirred with a stir bar. 24 raw dispersion liquids are prepared through such an operation, a total weight thereof is 9600 g, and the liquids are added to the tank made by SUS316L. Further, a solution (diluted with a mixture of methanol and ion-exchange water of 1:1 (volume ratio)) of 10 g/L of PLURONIC31R1 (manufactured by BASF) was added by 10 cc. By using the TYPE-20 AUTOMIXER (of which a stirring portion is HOMOMIXER MARKII) manufactured by PRIMIX Ltd., the mixture of the raw dispersion liquids in the tank was subjected to batch-type dispersing treatment at 9000 rpm for 120 minutes. The temperature of the liquid in progress of the dispersion was kept constant at 50° C. After the dispersion, the temperature thereof was decreased to 25° C., and then the liquid was filtered through a single path by using the PROFILE II FILTER (manufactured by Nihon Pall Co., Ltd., product type MCY1001Y030H13).

In such a manner, the dispersion liquid A1 was subjected to desalting and re-dispersion treatments, whereby the flat silver particle dispersion liquid B1 was prepared.

—Evaluation of Flat Metal Particles—

It was observed that, in the flat silver particle dispersion liquid A1, flat particles having hexagonal, circular, and triangular shapes, and the like were generated. In addition, in the dispersion liquid A1, all the metal microparticles were flat metal particles. Images, which were obtained through TEM observation for the flat silver particle dispersion liquid A, were input to an image processing software program IMAGEJ, and image processing was performed on the images. Image analysis was performed on 500 particles which were randomly selected from TEM images in several fields, and area circle-equivalent diameters were calculated. As a result of the statistical processing based on these parent populations, an average diameter thereof was 120 nm.

Likewise, the flat silver particle dispersion liquid B1 was measured. It had substantially the same result as the flat silver particle dispersion liquid A1 in terms of effects including the size distribution form.

The flat silver particle dispersion liquid B1 was dropped down and dried on a silicon substrate, and respective thicknesses of the flat silver particles were measured by the FIB-TEM method. Ten flat silver particles in the flat silver particle dispersion liquid B1 were measured, and an average thickness thereof was 8 nm.

—Preparation of Flat Silver Particle Dispersion Liquids A2 to A4 and B2 to B4—

In preparation of the flat silver particle dispersion liquids A1 and B1, flat silver particle dispersion liquids A2 to A4 and B2 to B4 were prepared by adjusting concentrations, heating temperatures, and pH of the respective solutions at the time of preparation such that thicknesses, diameters, and aspect ratios thereof were as shown in Table 1.

TABLE 1

Evaluation of flat silver particle dispersion liquids

|  | Thickness | Diameter | Aspect ratio |
|---|---|---|---|
| A1(b1) | 8 nm | 120 nm | 15.0 |
| A2(b2) | 6 nm | 100 nm | 16.7 |
| A3(b3) | 4 nm | 60 nm | 15.0 |
| A4(b4) | 18 nm | 290 nm | 16.1 |

—Preparation of Application Liquid for Metal-Microparticle-Containing Layer, Application Liquid for Dielectric Layer, and Application Liquid for High-Refractive Index Layer—

Application liquids C1A, C1B, C1C, C2 to C4, D1, and E1 were prepared on the basis of ratios of composition of materials shown in Table 2.

TABLE 2

|  | C1A | C1B | C1C | C1D | C2 | C3 | C4 | D1 | E1 |
|---|---|---|---|---|---|---|---|---|---|
| Polyurethane aqueous solution: HYDRAN HW-350 (manufactured by Dic Corp., solid content concentration of 30 mass %) | 0.27 | 0.3 | 0.24 | 0.08 | 0.22 | 0.18 | 0.3 | 1.83 | 3.23 |
| Surfactant A: F-LIPAL 8780P (manufactured by Lion Corp., solid content of 1 mass %) | 0.96 | 1.1 | 0.85 | 0.3 | 0.76 | 0.64 | 1.1 | 0 | 0.96 |
| Surfactant B: NAROACTY CL-95 (manufactured by Sanyo Chemical Industries, Ltd., solid content of 1 mass %) | 1.19 | 1.36 | 1.06 | 0.37 | 0.95 | 0.79 | 1.36 | 1.18 | 1.18 |
| Flat silver particle dispersion liquid B1 | 25 | 14.29 | 33.33 | 76.92 | 0 | 0 | 0 | 0 | 0 |
| Flat silver particle dispersion liquid B2 | 0 | 0 | 0 | 0 | 40 | 0 | 0 | 0 | 0 |
| Flat silver particle dispersion liquid B3 | 0 | 0 | 0 | 0 | 0 | 50 | 0 | 0 | 0 |
| Flat silver particle dispersion liquid B4 | 0 | 0 | 0 | 0 | 0 | 0 | 14.29 | 0 | 0 |
| 1-(5-methylureidophenyl)-5-mercaptotetrazole (manufactured by Wako Pure Chemical Industries, Ltd., solid content of 2 mass %) | 0.61 | 0.69 | 0.54 | 0.19 | 0.49 | 0.41 | 0.69 | 0 | 0 |
| Water | 41.97 | 47.96 | 37.31 | 12.91 | 33.58 | 27.98 | 47.96 | 64.63 | 64.63 |
| Methanol | 30 | 34.3 | 26.67 | 9.23 | 24 | 20 | 34.3 | 0 | 30 |
| Silica particle IPA dispersion liquid: THROUGH-REAR 4110 manufactured by JGC Catalysts And Chemicals Ltd., solid content concentration of 20.5 mass % | 0 | 0 | 0 | 0 | 0 | 0 | 0 | 4.06 | 0 |
| IPA | 0 | 0 | 0 | 0 | 0 | 0 | 0 | 25.94 | 0 |

In Table 2, the unit of each value is parts by weight.

An application liquid C5 was obtained through preparation which was performed in a manner similar to that of the application liquid C1A, except that, instead of the flat silver particle dispersion liquid B1 in the application liquid C1A for the metal-microparticle-containing layer in Table 2, an aqueous solution, in which silver nanoparticles (spherical particles of which diameters were 10 nm and each of which had an aspect ratio of 1) manufactured by Sigma-Aldrich Co. LLC. were dispersed, was used.

By using the application liquids C1A, C1B, C1C, C2 to C5, D1, and E1 obtained through preparation performed in such a manner, anti-reflection films as examples and comparative examples of the anti-reflection optical member of the present invention were separately produced. Table 3 collectively shows layer configurations of the examples and the comparative examples.

TABLE 3

Layer configuration of anti-reflection film

| | Transparent substrate | | | High-refractive index layer | | | Metal-microparticle-containing layer | | Dielectric layer | | |
|---|---|---|---|---|---|---|---|---|---|---|---|
| | Material | Refractive index | Thickness | Material | Refractive index | Thickness | Material | Thickness | Material | Refractive index | Thickness |
| Example 1 | TAC | 1.5 | 80 μm | — | — | — | Application liquid c1a | 20 nm | Application liquid d1 | 1.4 | 60 nm |
| Example 2 | TAC | 1.5 | 80 μm | — | — | — | Application liquid c1b | 20 nm | Application liquid d1 | 1.4 | 60 nm |
| Example 3 | TAC | 1.5 | 80 μm | — | — | — | Application liquid c1c | 20 nm | Application liquid d1 | 1.4 | 60 nm |
| Example 4 | TAC | 1.5 | 80 μm | — | — | — | Application liquid c2 | 20 nm | Application liquid d1 | 1.4 | 60 nm |
| Example 5 | TAC | 1.5 | 80 μm | — | — | — | Application liquid c3 | 20 nm | Application liquid d1 | 1.4 | 60 nm |
| Example 6 | TAC | 1.5 | 80 μm | — | — | — | Application liquid c4 | 20 nm | Application liquid d1 | 1.4 | 60 nm |
| Example 7 | TAC | 1.5 | 80 μm | Application liquid e1 | 1.6 | 55 nm | Application liquid c1a | 20 nm | Application liquid d1 | 1.4 | 70 nm |
| Comparative example 1 | TAC | 1.5 | 80 μm | — | — | — | Application liquid c5 | 20 nm | Application liquid d1 | 1.4 | 60 nm |
| Comparative example 2 | TAC | 1.5 | 80 μm | Application liquid e1 | 1.6 | 85 nm | — | — | Application liquid d1 | 1.4 | 100 nm |
| Comparative example 3 | TAC | 1.5 | 80 μm | — | — | — | Application liquid c1a | 20 nm | Application liquid d1 | 1.4 | 650 nm |
| Comparative example 4 | TAC | 1.5 | 80 μm | — | — | — | Application liquid c1d | 20 nm | Application liquid d1 | 1.4 | 60 nm |

Methods of producing the anti-reflection optical members (anti-reflection films) of the examples and the comparative examples will be described.

Example 1

The application liquid C1A for the metal-microparticle-containing layer was applied on a surface of a TAC film (FUJITAC, 80 μm, and a refractive index of 1.5) such that an average thickness thereof after drying thereof was 20 nm, by using a wire bar. Thereafter, the liquid was heated, dried, and solidified at 130° C. for one minute, and the metal-microparticle-containing layer was formed. The application liquid D1 for the dielectric layer is applied on the formed metal-microparticle-containing layer such that an average thickness thereof after drying thereof was 60 nm, by using the wire bar. Subsequently, the liquid was heated, dried, and solidified at 130° C. for one minute, and the anti-reflection optical member of Example 1 was obtained.

Examples 2 to 6, and Comparative Examples 1 and 4

Each anti-reflection optical member of Examples 2 to 6 and Comparative Example 4 was obtained in a manner similar to that of Example 1, except that the application liquid C1A for the metal-microparticle-containing layer on the TAC film (FUJITAC, 80 μm, and the refractive index of 1.5) in Example 1 was replaced with each of the application liquids described in the table.

Example 7

In Example 7, an anti-reflection optical member having a layer configuration, in which the high-refractive index layer 14 shown in FIG. 10 was provided, was produced.

The application liquid E1 for the high-refractive index layer was applied on the surface of the TAC film (FUJITAC, 80 μm, and the refractive index of 1.5) such that an average thickness thereof after drying thereof was 55 nm, by using the wire bar. Then, the application liquid C1A for the metal-microparticle-containing layer was applied such that an average thickness thereof after drying thereof was 10 nm, by using a wire bar. Thereafter, the liquid was heated, dried, and solidified at 130° C. for one minute, and the metal-microparticle-containing layer was formed. The application liquid D1 for the dielectric layer is applied on the formed metal-microparticle-containing layer such that an average thickness thereof after drying thereof was 70 nm, by using the wire bar. Subsequently, the liquid was heated, dried, and solidified at 130° C. for one minute, and the anti-reflection optical member of Example 7 was obtained.

Comparative Example 2

An anti-reflection optical member of Comparative Example 2 was produced in a manner similar to that of Example 1, except that the application liquid C1A for the metal-microparticle-containing layer on the TAC film (FUJITAC, 80 μm, and the refractive index of 1.5) in Example 1 was replaced with the application liquid E1 for the high-refractive index layer such that an average thickness thereof after drying thereof was changed to 85 nm and an average thickness of the application liquid D1 for the dielectric layer after drying thereof was changed to 100 nm.

Comparative Example 3

An anti-reflection optical member of Comparative Example 3 was produced in a manner similar to that of Example 1, except that an average thickness of the application liquid D1 for the dielectric layer on the TAC film (FUJITAC, 80 μm, and the refractive index of 1.5) after drying thereof in Example 1 was changed to 650 nm.

In each example and comparative example, by measuring a reflectance, a transmittance, and a bandwidth of 0.5% of visible light, it was checked whether or not the conductive path is formed.

<Measurement Method of Reflectance>

When light was incident from the dielectric layer side onto the optical film of each example, a reflectance at a wavelength of 550 nm was measured by using a reflection film thickness spectrometer FE3000 manufactured by Otsuka Electronics Co., Ltd. When the reflectance is equal to or greater than 0.5%, it was evaluated that the film is defective (NG). When the reflectance is less than 0.5%, it was evaluated that the film is good (OK).

<Measurement Method of Transmittance>

When light was incident from the dielectric layer side onto the optical film of each example, a transmittance at a wavelength of 550 nm was measured by using a spectrophotometer U4000 manufactured by Hitachi High-Technologies Coporation. When the transmittance is less than 80%, it was evaluated that the film is defective (NG). When the transmittance is equal to greater than 80%, it was evaluated that the film is good (OK).

<Measurement Method of Bandwidth of 0.5%>

When light was incident from the dielectric layer side onto the optical film of each example, a reflectance was measured by using the reflection film thickness spectrometer FE3000 manufactured by Otsuka Electronics Co., Ltd., and a wavelength bandwidth, at which the reflectance is equal to or less than 0.5%, was defined as "a bandwidth of 0.5%". When the bandwidth of 0.5% is less than 100 nm, it was evaluated that the film is defective (NG). When the bandwidth is equal to greater than 100 nm, it was evaluated that the film is good (OK).

<Method of Checking Forming of Conductive Path>

By observing a region of 2.5 μm×2.5 μm on the obtained anti-reflection film through the scanning electron microscope (SEM), it was determined that a conductive path is formed in a case where the microparticles are continuously connected in a range from the left end to the right end, and it was determined that a conductive path is not formed in a case where the microparticles are disconnected in midcourse.

<Area Ratio of Metal Microparticles>

At the time of manufacturing in the examples and the comparative examples, after the metal-microparticle-containing layer was formed, before the dielectric layer was formed, an image, which was obtained through observation using the scanning electron microscope (SEM), was binarized. Then, an area ratio [(B/A)×100] of a sum B of areas of the metal microparticles to an area A of the substrate in a case where the metal-microparticle-containing layer is viewed from the top was calculated.

Table 4 shows measurement results and evaluation results of the examples and the comparative examples.

TABLE 4

| | Conditions of metal microparticles | | | | Evaluation | | | | | |
|---|---|---|---|---|---|---|---|---|---|---|
| | Thickness | Diameter | Area ratio | Conductive path | Reflectance | | Transmittance | | 0.5% Bandwidth | |
| Example 1 | 8 nm | 120 nm | 21% | NO | 0.10% | OK | 89% | OK | 170 nm | OK |
| Example 2 | 8 nm | 120 nm | 11% | NO | 0.23% | OK | 91% | OK | 200 nm | OK |
| Example 3 | 8 nm | 120 nm | 29% | NO | 0.06% | OK | 88% | OK | 150 nm | OK |
| Example 4 | 6 nm | 100 nm | 39% | NO | 0.09% | OK | 90% | OK | 180 nm | OK |
| Example 5 | 4 nm | 60 nm | 58% | NO | 0.08% | OK | 90% | OK | 180 nm | OK |
| Example 6 | 18 nm | 290 nm | 12% | NO | 0.13% | OK | 87% | OK | 150 nm | OK |
| Example 7 | 8 nm | 120 nm | 20% | NO | 0.05% | OK | 90% | OK | 250 nm | OK |
| Comparative example 1 | 10 nm | 10 nm | 71% | YES | 2.04% | NG | 78% | NG | 0 nm | NG |
| Comparative example 2 | — | — | — | NO | 0.53% | NG | 94% | OK | 0 nm | NG |
| Comparative example 3 | 12 nm | 200 nm | 20% | NO | 0.12% | OK | 91% | OK | 30 nm | NG |
| Comparative example 4 | 8 nm | 120 nm | 85% | YES | 4.20% | NG | 75% | NG | 0 nm | NG |

As shown in Table 4, in Examples 1 to 7, desired results could be obtained in terms of any one of the reflectance, the transmittance, and the bandwidth of 0.5%. In particular, in Example 7 where the high-refractive index layer is provided, it was possible to obtain an extremely low reflectance and a large bandwidth. On the other hand, in Comparative Examples 1 to 4, at least one of the reflectance, the transmittance, or the bandwidth of 0.5% was poor.

Figure 11:
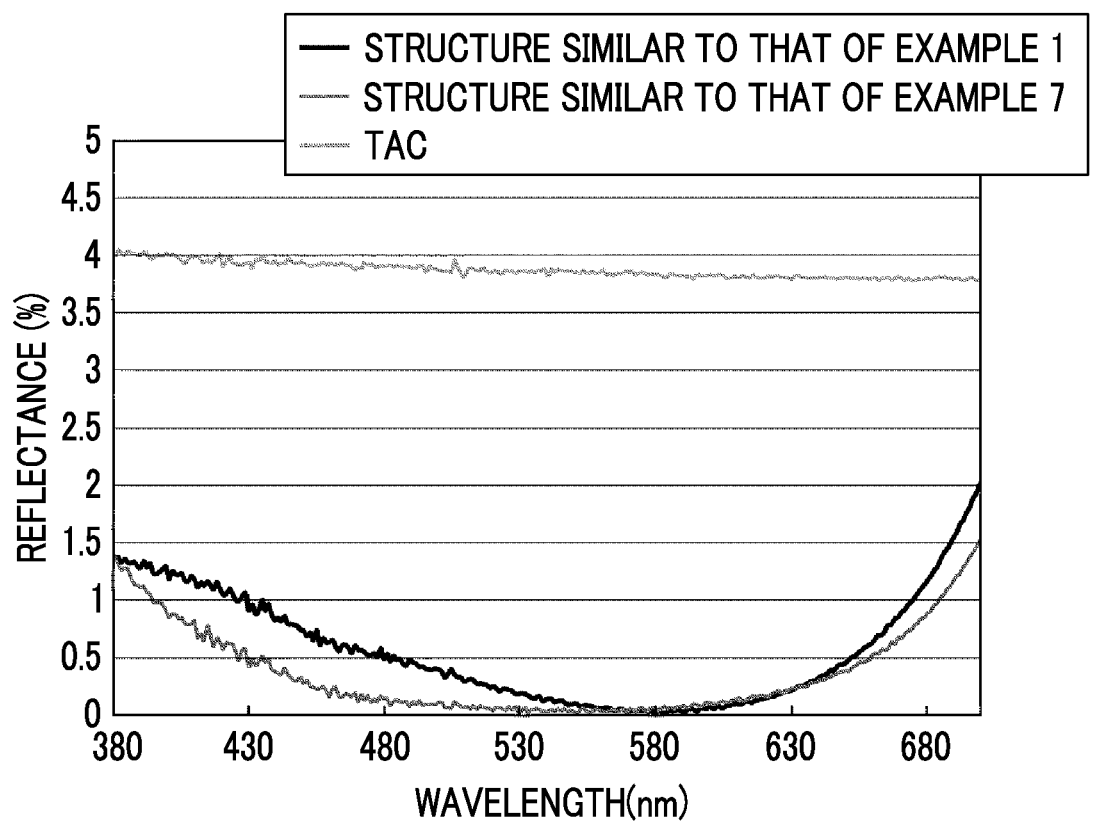
FIG. 11 is a graph illustrating an anti-reflection effect of the example.

FIG. 11 shows experiment results of the anti-reflection effect indicating wavelength dependency of the reflectances of the TAC as a transparent substrate and the optical films having a structure similar to that of Example 1 (2 of Example 1) and a structure similar to that of Example 7 (2 of Example 7). The experiment was performed in air ($n_0=1$) as a predetermined medium. In 2 of Example 1 in FIG. 11, a TAC ($n_1=1.5$; 80 μm), a metal-microparticle-containing layer with 10 nm, and a dielectric layer ($n_2=1.35$; 65 nm) were used. In 2 of Example 7, a TAC ($n_1=1.5$; 80 μm), a high-refractive index layer ($n_3=1.6$; 60 nm), a metal-microparticle-containing layer with 10 nm, and a dielectric layer ($n_2=1.35$; 70 nm) were used.

As shown in FIG. 11, in both 2 of Example 1 and 2 of Example 7, as compared with the reflectance of the transparent substrate itself, it was possible to achieve a low reflectance with the laminated structure of the metal-microparticle-containing layer and the dielectric layer. In particular, in 2 of Example 7, it was possible to set the reflectance to 0.5% throughout a broad spectrum.

What is claimed is:

1. An anti-reflection optical member, used in a medium, that prevents incident light with a predetermined wavelength from being reflected, the anti-reflection optical member comprising a laminated structure in which the following are laminated in this order:
   a transparent substrate that has a first refractive index greater than that of the medium;
   a metal-microparticle-containing layer that contains a plurality of metal microparticles; and
   a dielectric layer that has a second refractive index greater than that of the medium, wherein at least 60% of all the plurality of metal microparticles are flat metal particles each of which has a ratio of diameter to thickness of equal to or greater than 3, wherein main flat surfaces of the flat metal particles are oriented in a plane at in a range of 0° to 30° to a surface of the metal-microparticle-containing layer, wherein in the metal-microparticle-containing layer, the plurality of metal microparticles is disposed without forming a conductive path, wherein a thickness of the dielectric layer is a thickness at which light reflected on a surface of the dielectric layer in a case where the incident light enters the laminated structure from the surface of the dielectric layer interferes with and is canceled out by light reflected on an interface between the dielectric layer and the metal-microparticle-containing layer, wherein said incident light with the predetermined wavelength is visible light, and wherein a wavelength bandwidth, at which a reflectance of the incident light is equal to or less than 0.5%, is equal to or greater than 100 nm.

2. The anti-reflection optical member according to claim 1, wherein the predetermined wavelength is a wavelength shorter than a plasmon resonance wavelength of the flat metal particles.

3. The anti-reflection optical member according to claim 2, wherein a thickness of the dielectric layer is equal to or less than 400 nm.

4. The anti-reflection optical member according to claim 3, wherein the thickness of the dielectric layer is a thickness which is equal to or less than an optical path length of $\lambda/4$ when the predetermined wavelength is set as $\lambda$.

5. The anti-reflection optical member according to claim 2, wherein the thickness of the dielectric layer is a thickness which is equal to or less than an optical path length of $\lambda/4$ when the predetermined wavelength is set as $\lambda$.

6. The anti-reflection optical member according to claim 1, wherein a thickness of the dielectric layer is equal to or less than 400 nm.

7. The anti-reflection optical member according to claim 3, wherein the thickness of the dielectric layer is a thickness which is equal to or less than an optical path length of $\lambda/4$ when the predetermined wavelength is set as $\lambda$.

8. The anti-reflection optical member according to claim 1, wherein the thickness of the dielectric layer is a thickness which is equal to or less than an optical path length of $\lambda/4$ when the predetermined wavelength is set as $\lambda$.

9. The anti-reflection optical member according to claim 1, wherein the flat metal particles have a diameter that is equal to or less than 300 nm.

10. The anti-reflection optical member according to claim 1, wherein the metal microparticles are made of silver.

11. The anti-reflection optical member according to claim 1, wherein the first refractive index is less than 1.8.

12. The anti-reflection optical member according to claim 1, wherein in the metal-microparticle-containing layer, at least 50% of the plurality of metal microparticles are disposed to be isolated from each other.

13. The anti-reflection optical member according to claim 1, comprising a high-refractive index layer that has a third refractive index greater than the first refractive index between the transparent substrate and the metal-microparticle-containing layer.

14. The anti-reflection optical member according to claim 1, wherein an area ratio between the plurality of metal microparticles and the metal-microparticle-containing layer in plan view is equal to or greater than 5% and equal to or less than 70%.

15. The anti-reflection optical member according to claim 1, wherein a transmittance of the incident light is equal to or greater than 80%.

* * * * *